J. V. CLARY.
POWER TRANSMITTING APPARATUS.
APPLICATION FILED JULY 6, 1920. RENEWED JAN. 25, 1922.
1,409,080.  Patented Mar. 7, 1922.
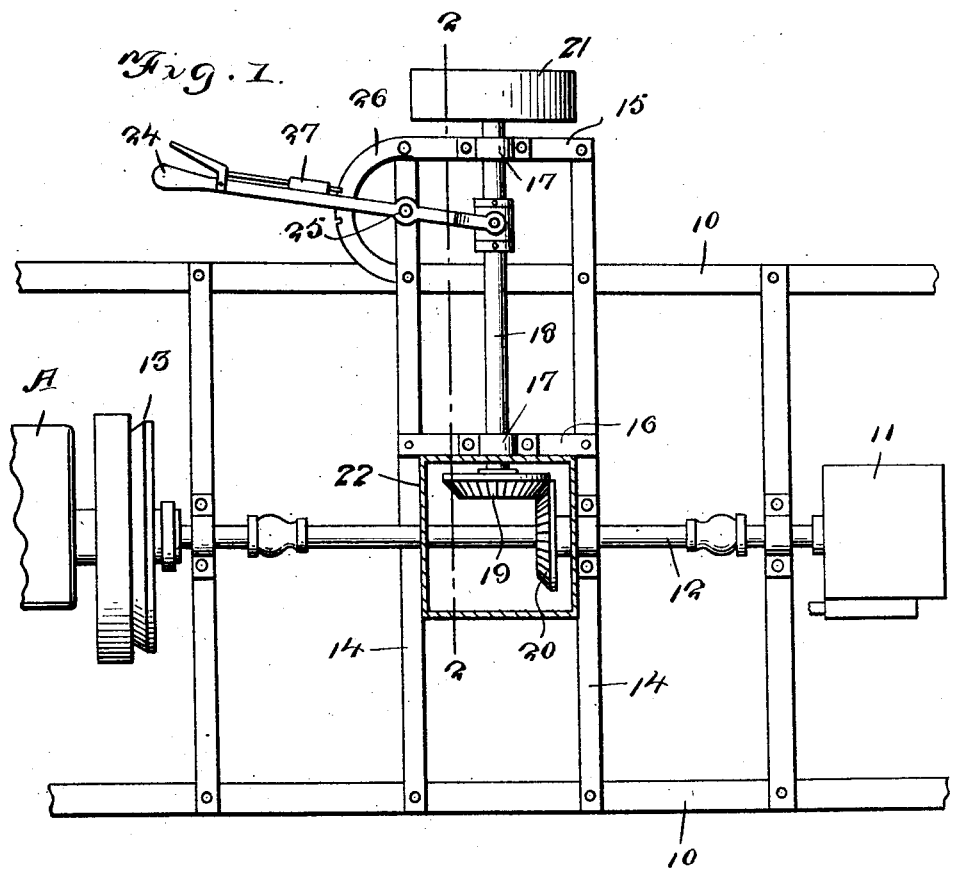
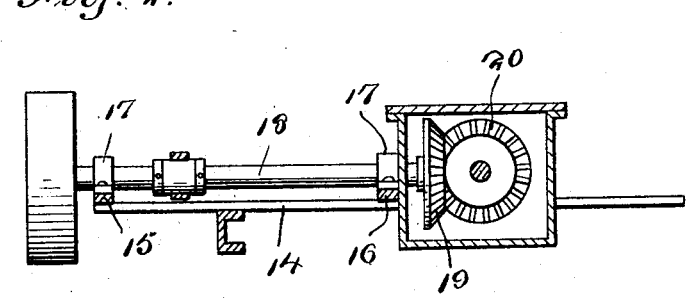

UNITED STATES PATENT OFFICE.

JOHN V. CLARY, OF NEWBERRY, SOUTH CAROLINA.

POWER-TRANSMITTING APPARATUS.

1,409,080.　　　　　　Specification of Letters Patent.　　Patented Mar. 7, 1922.

Application filed July 6, 1920, Serial No. 394,167. Renewed January 25, 1922. Serial No. 531,820.

*To all whom it may concern:*

Be it known that I, JOHN V. CLARY, a citizen of the United States, residing at Newberry, in the county of Newberry and State of South Carolina, have invented new and useful Improvements in Power-Transmitting Apparatus, of which the following is a specification.

This invention comprehends the provision of a power transmitting apparatus designed for use in connection with motor operated trucks or the like, whereby the power from the truck may be utilized to drive machinery of different character.

The invention is in the nature of an attachment for the truck or the like, and embodies amongst other features a driven shaft journaled on a frame which is connected to the chassis of the truck, the shaft being driven from the drive shaft of the truck or other vehicle with which the attachment may be used.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:—

Figure 1 is a fragmentary plan view of the motor operated vehicle showing the invention associated therewith.

Figure 2 is a sectional view taken on line 2—2 of Figure 1.

Referring to the drawing in detail A indicates generally a part of a motor operated truck or the like, wherein 10 represents the side members of the frame, 11 the transmission, 12 the drive shaft and 13 the clutch.

The apparatus forming the subject matter of my invention is in the nature of an attachment, designed for use in connection with a truck or the like of the above mentioned character, and embodies a supporting structure consisting of spaced parallel members 14 connected by an end member 15 and a transverse member 16. This supporting structure is arranged transversely of the frame of the truck or other vehicle with which it is used, and secured thereto in any suitable manner. This supporting structure projects a slight distance beyond one side of the truck as clearly illustrated in Figure 1. The end member 15 and the transverse member 16 provide bearings 17 for a driven shaft 18, this shaft carrying a bevel gear 19 which meshes with a similar gear 20 supported by the drive shaft 12. The bevel gear 19 is arranged at one end of the driven shaft 18, the opposite end of this shaft supporting a belt pulley 21. Between the parallel members 14 is supported a casing 22 which houses the gears 19 and 20 respectively, and as shown in Figure 2 both the drive shaft 12 and the driven shaft 18 enter this casing. The driven shaft 18 is mounted for sliding movement so that the gear 19 may be moved into and out of engagement with the gear 20 as the occasion requires, and the shaft 18 is adjusted through the instrumentality of a lever 24 terminally connected with the shaft 18 and fulcrumed as at 25. Projecting from one of the members 14 is a toothed segment 26 with which a pawl 27 cooperates to hold the shaft 18 in an adjusted position, the pawl of course being carried by the lever 24.

In practice, when use of the apparatus is desired, the truck or other vehicle with which the attachment is used is thrown out of gear, but the motor continued in operation to drive or rotate the shaft 12. The lever 24 is then actuated to move the gear 19 into engagement with the gear 20, whereupon the shaft 18 is rotated from the drive shaft 12. This shaft of course is operated to drive machinery of any kind through the instrumentality of a belt trained over the belt pulley 21.

While it is believed that from the foregoing description the nature and advantages of the invention will be readily apparent, I desire to have it understood that I do not limit myself to what is herein shown and described and that such changes may be resorted to when desired as fall within the scope of what is claimed.

What is claimed is:

In a power transmitting apparatus comprising a pair of spaced parallel members adapted to be arranged transversely of and supported upon the frame of a motor operated vehicle, said members projecting beyond one side of the frame, transverse elements connecting the said members at one end and at a point in their length, each of said elements forming a part of the bearings, a shaft journaled in said bearings, said shaft being also mounted for sliding movement, a gear secured to the drive shaft of the vehicle, a second gear carried by the aforementioned shaft, whereby the latter is driven from the drive shaft, a casing housing said gears, a belt pulley carried by the outer end of the driven shaft, means for sliding the latter mentioned shaft including a lever, and means for holding the lever in an adjusted position.

In testimony whereof I affix my signature.

JOHN V. CLARY.